United States Patent Office 2,741,467
Patented Apr. 10, 1956

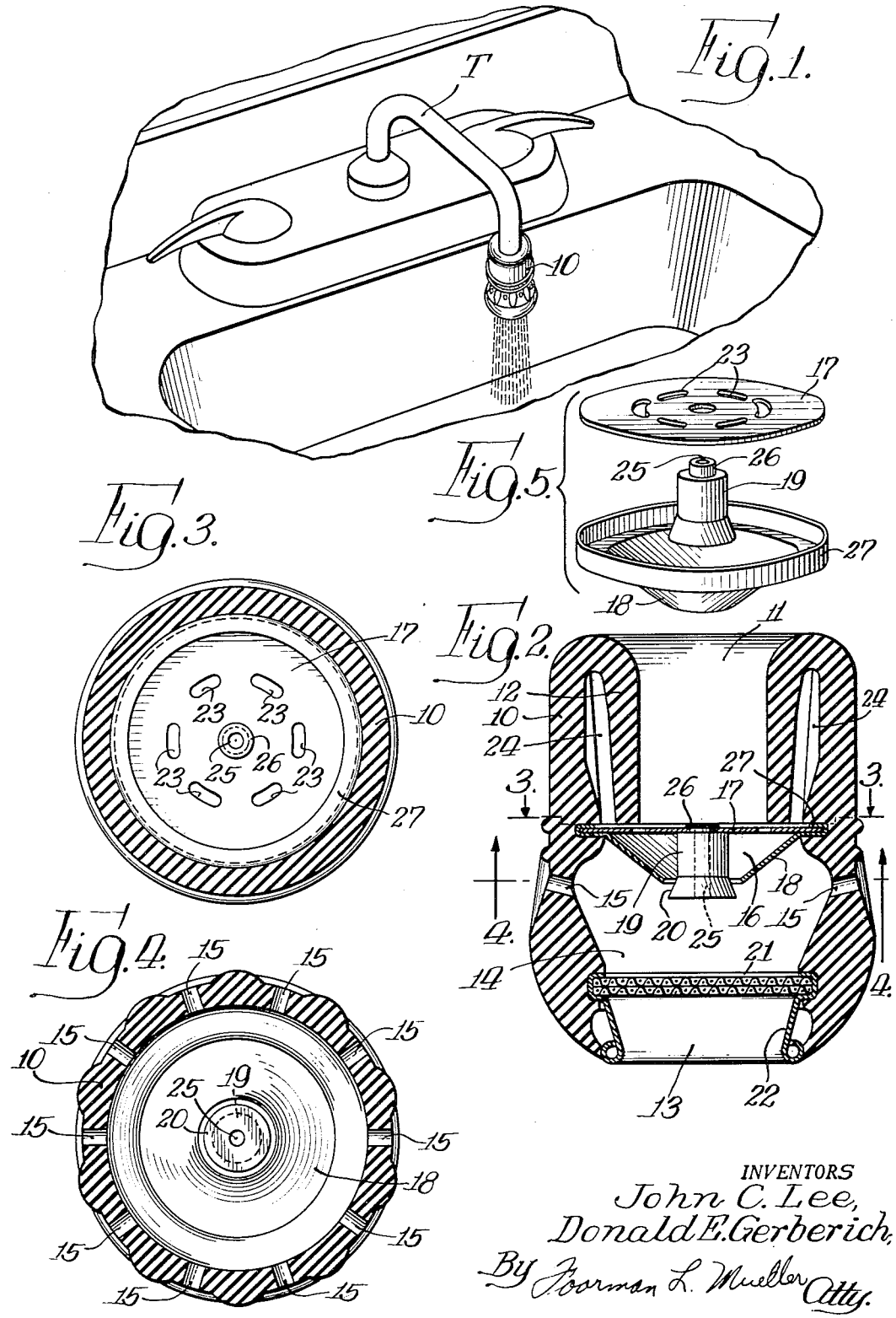

2,741,467

AERATOR

John C. Lee, Chicago, and Donald E. Gerberich, Aurora, Ill., assignors, by mesne assignments, to Orloff W. Holden and Margaret H. Holden, a partnership doing business as Knickerbocker Rubber Company, Chicago, Ill.

Application November 1, 1952, Serial No. 318,182

4 Claims. (Cl. 261—76)

This invention relates to a device for aerating a liquid under pressure, and more particularly to an aerator device for use with a water faucet.

The invention is directed to a device which may be connected to a source of liquid under pressure, such as a water faucet, in which the fluid is finely broken up and thoroughly mixed with air, and from which the fluid flows in a soft coherent stream that does not splash upon impingement with hard objects. Devices of this general type are known to the art, but most suffer from a disadvantage in that they are incapable of producing a satisfactory, well defined, soft, highly aerated stream of fluid; or that they are so constituted as to be easily clogged with foreign material in the fluid; or in that their construction is unduly complicated so as to be relatively expensive.

It is an object of the present invention to provide an improved aerating device that overcomes the aforementioned disadvantages of the prior art.

Another object of the invention is to provide such an improved aerating device which is so constructed that it is not susceptible to clogging by foreign matter within the liquid.

A further object of the invention is to provide an improved aerating device which is constructed to produce a well defined, smooth and coherent mixture of fluid and air.

Yet a further object of the invention is to provide such an improved aerating device which is exceedingly simple in its construction so as to be relatively inexpensive.

A feature of the invention is the provision of an aerating device including an impact spray type nozzle supported within a casing, the nozzle including a disc member extending across the casing and having relatively large apertures therein which are not easily clogged by foreign matter in the liquid translated by the device, an open-ended, hollow truncated cone supported under the apertured disc with its large end upward and a center pin against which the liquid emerging from the apertures is splashed by the cone. The center pin has a flared end portion extending through the small end of the cone which directs the liquid into the aerating chamber and upon a foraminous diffusing member in such a manner to provide improved aerating action.

Another feature of this invention is the provision of an aerating device having an impact spray type nozzle including a center pin with an opening therethrough which causes the stream from the aerating device to be more uniform. The opening in the center pin also facilitates assembly of the components forming the nozzle.

Other objects and features and the attending advantages of the invention may best be understood by reference to the following description when taken in conjunction with the accompanying drawing, in which:

Fig. 1 shows the aerating device of this invention mounted upon a well-known water faucet;

Fig. 2 is a sectional view of the aerating device of this invention;

Figs. 3 and 4 are views taken along the lines 3—3 and 4—4 respectively of Fig. 2; and, Fig. 5 illustrates the nozzle structure prior to assembly thereof in exploded form.

In practicing the invention there is provided a one-piece cylindrical casing made of resilient material such as rubber. The casing has an inlet at one end adapted to be connected to a water faucet or the like and a nozzle structure adjacent the inlet providing an impact spray for breaking up the stream of water into fine particles. The nozzle structure includes a disc having large apertures, a frusto-conical shaped member under the disc for deflecting the water emerging through the apertures, and a center pin against which the water is splashed, with the water emerging as a fine spray from the space between the pin and the cone. The center pin has a flared end portion for directing the spray on a foraminous diffusing structure at the outlet end of the casing. The casing has openings through which air is drawn by the spray, with the air being mixed into the spray and discharged therewith through the foraminous diffusing member. The center pin may have an opening therein which permits a small amount of water to enter into the stream for causing the same to be more round and uniform. This opening also facilitates assembly of the nozzle structure as it may receive a centering pin, and provides a tubular portion or eyelet which may be secured to the apertured disc.

Referring now to Figs. 1–5 of the drawing, there is shown one embodiment of the invention comprising a casing 10 of resilient material which is generally cylindrical in form. Casing 10 has at one end an inlet portion 11 defined by a re-entrant portion 12 which may be slipped over the end of a water faucet to secure the casing 10 thereon. In Fig. 1, the device is shown applied to a faucet T. The casing may be formed of rubber or similar resilient material, and the inturned or re-entrant portion 12 may be of reduced thickness to increase the flexibility and the resilience thereof. A series of vertical, integral stiffening ribs 24 are formed on the inner surface of casing 10 facing the inturned portion 12. These ribs also serve as spacers for admitting fluid to the back of portion 12 to provide that portion with extra force to grip the faucet. At the end of casing 10 opposite to the inlet portion 11 is an outlet portion 13, and between the inlet and outlet a mixing or aerating chamber 14 is formed in the casing. A plurality of apertures 15 are provided in the casing leading into the mixing chamber 14 for the entry of air into the chamber. The air and liquid are mixed in chamber 14 through the operation of components of the device which are to be described in detail hereinafter.

Disposed in casing 10 between inlet portion 11 and chamber 14 is a nozzle structure 16 which includes an apertured orifice disc 17 extending across casing 10 about 1/32 inch from the bottom of inturned portion 12 and inserted into a groove in the casing. The nozzle also includes a hollow open-ended frusto-conical shaped splash member 18 supported below disc 17 in coaxial relation with the longitudinal axis of the casing and with its large end facing and secured to the disc by turning a peripheral flange associated therewith over the edge of the disc, and its small end facing outlet 13. The nozzle also includes a cylindrical center pin 19 supported in coaxial relation with the longitudinal axis of casing 10 within conical member 18 and having one end secured to disc 17 through a center hole in the disc, and having a flared end 20 extending through the small end of cone 18. As clearly shown in Fig. 2, the conical member 18 forms a wall extending at an angle of the order of 45° with respect to the plane of the disc 17 on which substantially all of the water passing through the apertures in the disc impinges.

The center pin has a small longitudinal hole 25 therein which passes a small stream of fluid into the aerating chamber 14.

The disc 17, splash member 18 and center pin 19 of the nozzle structure are shown in unassembled form in Fig. 5. The hole 25 in the pin 19 may be used to position the pin during the assembly operation and forms a riveting portion 26 which is used to secure the pin 19 to the disc 17. The splash member 18 has a rim 27 which is turned over the disc 17 to hold these members in assembled relation.

Foraminous diffuser means 21 is placed in a nipple 22 which, in turn, is removably supported at outlet 13 of casing 10. The diffuser means extends across the casing at the end of the nipple facing the nozzle, and the diffuser and nozzle define the aforementioned mixing chamber 14. The diffuser comprises, for example, a plurality of discs of metal screen or other suitable foraminous material which overlie each other and have their edges secured together by any suitable means. It has been found that highly satisfactory results may be achieved by the use of three such screens in 30-30 mesh made from .012 inch woven wire separated by a wire ring, although a different number of screens or rings may be used if so desired.

As best shown in Fig. 3, the apertures in disc 17 designated 23, may take the form of arcuate slots and may have a relatively large size compared to the minute apertures generally utilized in the prior devices and, for that reason, are not generally susceptible to clogging. The device has been found to operate efficiently when 6 such apertures are used, .055 inch wide and evenly spaced at 30° angles around the center hole of disc 17 at a %2" radius.

The flared end portion 20 of center pin 19 defines a selected obtuse angle with the cylindrical portion of the pin. This angle is so selected with respect to the distance of diffuser 21 from the end of pin 19 that the liquid emerging from the space between splash cone 18 and the pin does not spread beyond the edge of the diffuser means. This prevents back pressure and the undesired emergence of fluid through the air inlet apertures 15.

The provision of nipple 2 which, as shown has a converging configuration, has been found to improve greatly the coherence and smoothness of the stream emerging from outlet 13.

When the device of the invention is placed in operation, water or other fluid under pressure passes through inlet portion 11 and through apertures 23 in disc 17. The resulting jets acquire high velocity due to the conversion of the pressure energy to velocity energy and are directed against the inner surface of conical splash member 18 which directs the same against the pin 19 and breaks the water into droplets which are discharged through the annular opening between center pin 19 and the cone as a fine spray of hollow conical shape. The area of the annular opening is made sufficiently large so that the space inside the cone will be filled with air, and the full effect of impingement can be obtained. The center pin acts as a reflector and separator for the droplets and, should the pin be omitted, some of the droplets would collide with each other and re-combine. The flared portion 20 at the end of the center pin is desirable to spread the spray and prevent the water from dripping down along the walls of the pin. The resulting spray, as previously mentioned, is directed to diffuser 21, and the angle of flared portion 20 and the distance of pin 19 from the diffuser is so related that the spray does not spread beyond the edge of the diffuser screens. The spray from the opening between the splash cone 18 and the center pin 19 draws air in through apertures 15 in accordance with well-known Venturi principles, and as the spray of water droplets discharging from the spray cone hit the wire screens of diffuser 21, air bubbles are entrained and thoroughly mixed with the fluid so that a soft aerated stream of water emerges from outlet 13, which does not splash upon impingement on a hard surface. The small stream passing through hole 25 in pin 19 is not substantially aerated, but passes directly through the aerating chamber 14 and diffuser 21 and functions to shape the aerated stream from outlet 13.

The aerating device of this invention has been found to be very effective in operation and, as can be seen, is of exceedingly simple construction. The apertures 23 in disc 17 are large enough to pass solid suspension of the size normally found in domestic water supplies so that no cleaning is needed for the spray cone. The uniform and fine spray discharging from the spray cone gives thorough and better aeration at the diffuser than could be achieved by prior art devices, and the hollow spray also gives the air better access and produces less flow resistance to the water particles.

In a constructed embodiment of the aerator of this invention, highly efficient operation was realized with the following dimensions, and these dimensions are listed herein merely by way of example:

Overall height: 1⅞ inches
Length of inturned portion 12: 13/16 inch
Diameter of inlet 11: 19/32 inch
Diameter of disc 17: 1⅛ inches
Distance from disc 17 to diffuser 21: ⅝ inch
Length of diffuser nipple 22: .396 inch
Diameter of diffuser outlet 13: .720 inch
Length of cylindrical portion of pin 19: .199 inch
Diameter of cylindrical portion of pin 19: .218 inch
Length of flared portion of pin 19: .086 inch
Diameter of pin 19 at lower end: .300 inch
Length of riveting portion 26 of pin 19: .062 inch
Diameter of riveting portion 26 of pin 19: .128 inch
Diameter of hole 25 at riveting portion: .089 inch
Diameter of hole 25 below riveting portion: .062 inch
Diameter of small end of cone 18: 11/32 inch While a particular embodiment of the invention has been shown and described, modifications may be made, and it is intended in the appended claims to cover all such modifications as fall within the true spirit and scope of the invention.

We claim:

1. In a device for aerating a liquid including a cylindrical casing and having a central passageway with inlet and outlet portions and a peripheral ring of aerating ports at a medial portion, spray means comprising, in combination a disc within the passageway and upstream of the aerating ports, a ring of apertures in the disc, a center pin mounted downstream of the disc having a frusto-conical lower portion oriented to diverge downstream, a second frusto-conical member oriented to converge downstream and beneath the disc apertures, the inner faces of the second frusto-conical section intersecting in projection the frusto-conical portion of the pin thereby defining an annular opening, and directing the flow of liquid from the disc apertures onto the frusto-conical portion of the pin where the fluid reverses its flow and manifests an induced turbulence as it enters the aerating zone.

2. In an aerator of the character defined in claim 1, a dimensional limitation of not less than .05 inch for the disc apertures and for the annular opening defined at the adjacent portions of the two frusto-conical members.

3. In a device for aerating a liquid including a cylindrical casing with a central passageway having inlet and outlet portions, and a peripheral ring of aerating ports; spray means comprising, in combination, a disc across the passageway upstream of the aerating ports having a ring of arcuate apertures and a central port, a center pin secured to the disc and having a hollow passageway mating with the disc central port, a frusto-conical section at the lower end of the center pin oriented to diverge downstream, and a second frusto-conical member downstream of the disc apertures and having a face intersecting the axes of the disc apertures oriented to converge the flow of liquid directed on its face by the disc apertures to impinge on the center pin frusto-conical section thereby reversing the flow of liquid before passing the aerating ports.

4. An aerator of the character defined in claim 3, in which the second frusto-conical member angles at 45° with the apertured disc.

References Cited in the file of this patent

UNITED STATES PATENTS

| | | |
|---|---|---|
| 1,917,216 | Bersted | July 11, 1933 |
| 2,316,832 | Aghnides | Apr. 20, 1943 |
| 2,423,960 | Bucknell et al. | July 15, 1947 |
| 2,510,395 | Goodrie | June 6, 1950 |
| 2,510,396 | Goodrie | June 6, 1950 |
| 2,564,060 | Gettins | Aug. 14, 1951 |
| 2,633,343 | Aghnides | Mar. 31, 1953 |